Aug. 27, 1940.　　　R. M. SOMERS　　　2,212,672
PHONOGRAPH
Filed Nov. 5, 1938　　　4 Sheets-Sheet 2
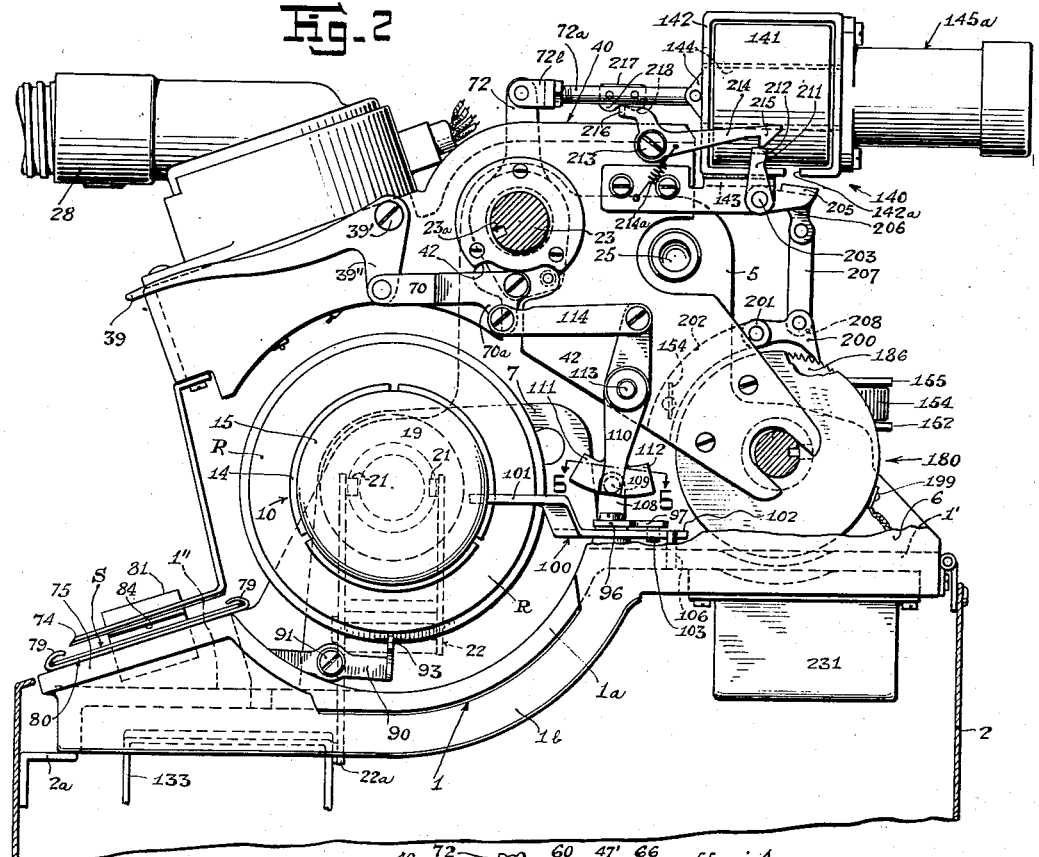
Fig. 2
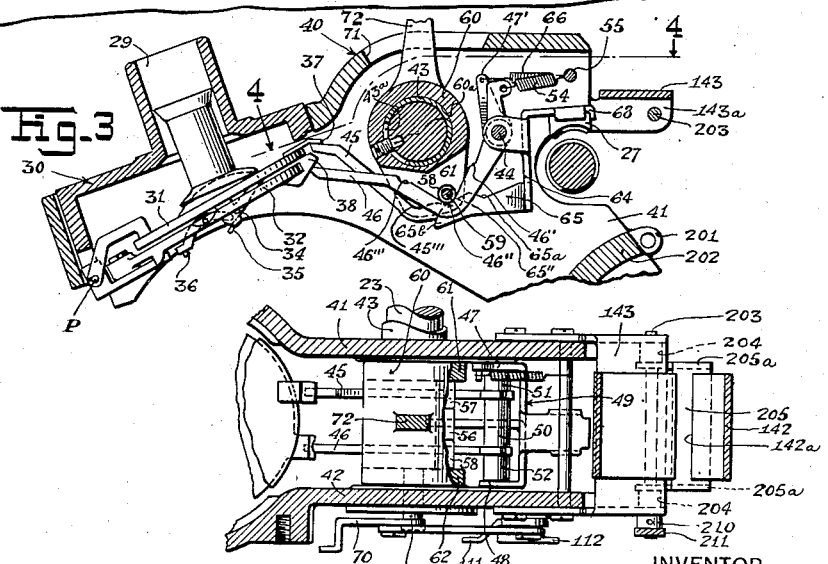
Fig. 3
Fig. 4
INVENTOR
Richard M. Somers
BY
Henry Lanahan
ATTORNEY

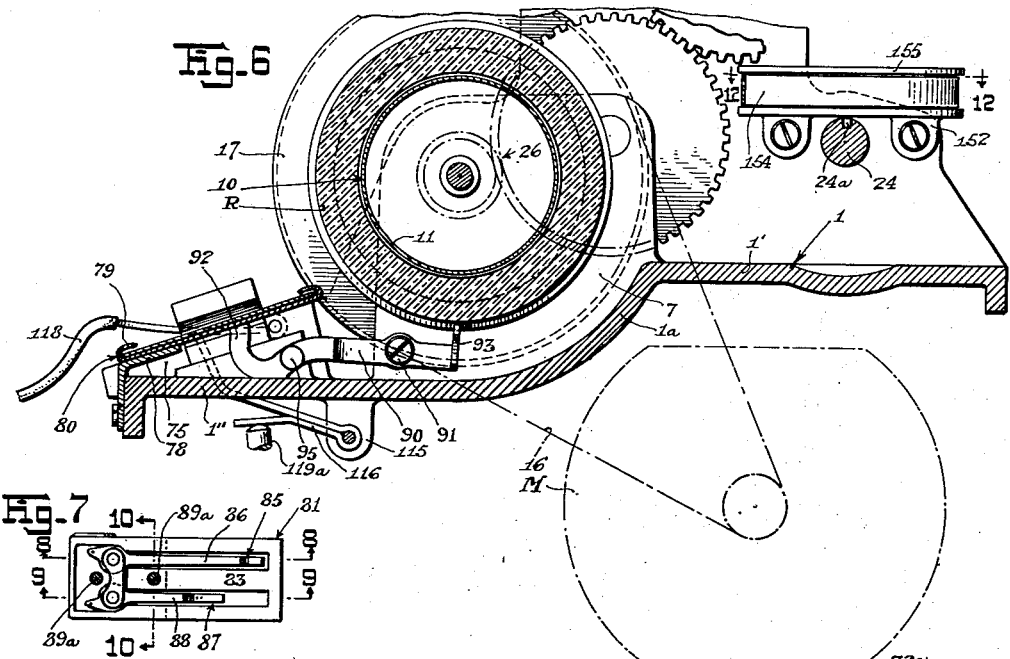

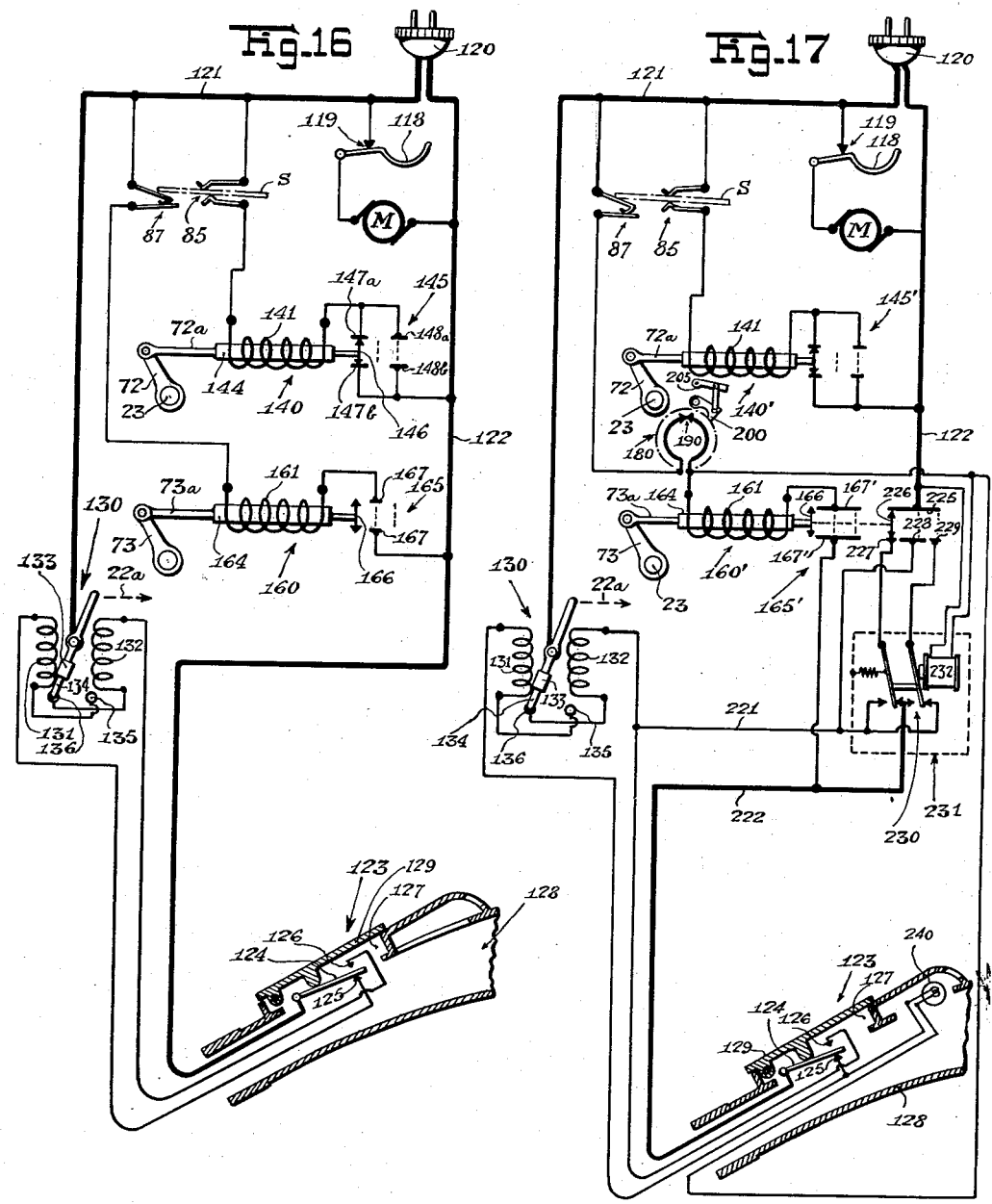

Patented Aug. 27, 1940

2,212,672

UNITED STATES PATENT OFFICE 2,212,672

PHONOGRAPH

Richard M. Somers, West Orange, N. J., assignor to Thomas A. Edison, Incorporated, West Orange, N. J., a corporation of New Jersey Application November 5, 1938, Serial No. 239,055

30 Claims. (Cl. 274—21)

This invention relates to phonographs, and in most of its aspects to phonographs of the type adapted for the recordation, or the selective recordation and reproduction, of dictation or similar matter.

It is a general object of my invention to provide an improved phonograph of the type described.

It is an object to provide improvements which facilitate the operation of the phonograph, or which reduce the number of manipulations required in its use.

It is an object to enforce proper operational sequences in the use of the phonograph.

It is an object to cause the manipulation of the index blank, customarily employed in such phonographs to receive record-accompanying annotations, to control each of several functions of the machine.

It is an object to automatically perform several of the required manipulations of the machine in response to the manipulation of the index blank.

It is an object to employ the index blank in connection with the safeguarding of the machine against improper operation.

It is an object to provide improved means for preventing a recording operation over record portions already recorded on.

It is an object to provide improved means for preventing a reproducing operation from a record portion not yet recorded on.

It is an object to provide improved means for automatically changing the condition of the machine after it has reproduced matter already recorded on the record.

It is an object to provide improved means for obviating initial contacting of the record by portions of the translating device while the two are subjected to relative movement.

It is an object to provide improved means for indicating the readiness of the machine to receive and record dictation and the like.

Other and allied objects will more fully appear from the following description and the appended claims.

In the description reference is had to the accompanying drawings, of which:

Figure 2 is a righthand elevational view of the phonograph, the righthand end standard 6 having been broken away for better illustration of the components therebeyond;

Figure 3 is a vertical cross-sectional view taken substantially along the line 3—3 of Figure 1;

Figure 4 is a substantially horizontal cross-sectional view taken along the line 4—4 of Figure 3;

Figure 5 is a fragmentary horizontal cross-sectional view taken along the line 5—5 of Figure 2;

Figure 6 is a vertical cross-sectional view taken substantially along the line 6—6 of Figure 1;

Figure 7 is a substantially horizontal cross-sectional view taken through the switch housing 81 just beneath its top;

Figure 8 is a vertical cross-sectional view taken along the line 8—8 of Figure 7;

Figure 9 is a vertical cross-sectional view taken along the line 9—9 of Figure 7;

Figure 10 is a vertical cross-sectional view taken along the line 10—10 of Figure 7;

Figure 11 is a fragmentary front elevational view of the lower portion of the lefthand end of the mandrel 10 and parts immediately associated therewith;

Figure 12 is a horizontal cross-sectional view taken along the line 12—12 of Figure 6;

Figure 13 is a rear elevational view of the bottom portion of the carriage 40, showing the advance device 180 in vertical cross-section;

Figure 14 is a rear elevational view of the carriage showing the advance device elevationally;

Figure 15 is a vertical cross-sectional view taken along the line 15—15 of Figure 13;

Figure 16 is a schematic electrical diagram of a simple embodiment of my invention; and Figure 17 is a schematic electrical diagram of a more elaborate, and the preferred, embodiment of my invention.

Figure 1:
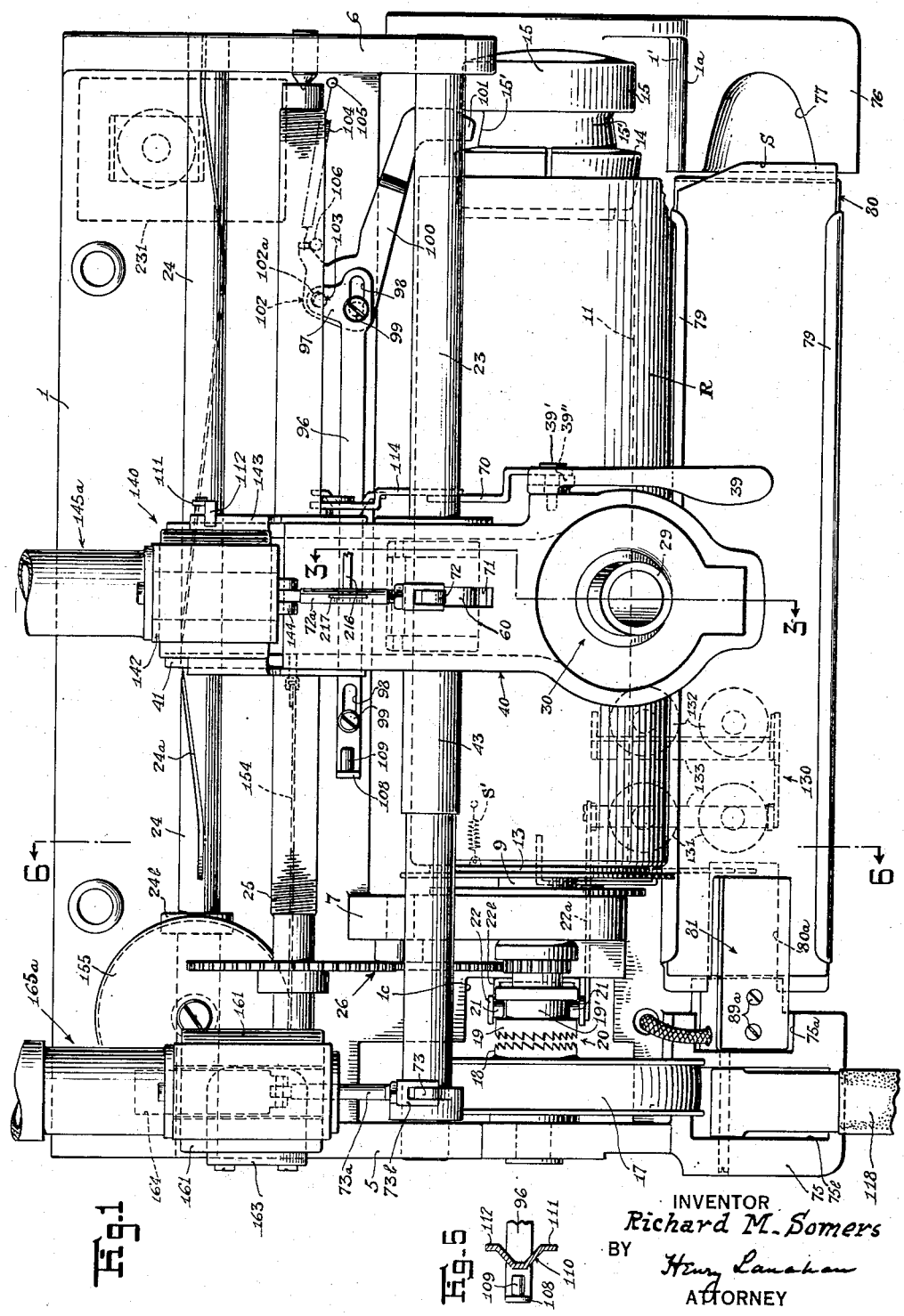
Figure 1 is a plan view of the principal part of a phonograph in which my invention has been embodied.

The phonograph in which my invention has been embodied may be generally described with reference first to Figures 1, 2 and 6. It includes a cast base plate 1 having a forward portion 1" which is generally horizontal but which curves upwardly at its rear 1a to join a raised horizontal rearward portion 1', as best seen in Figure 6. This base plate may be provided with the downward flange 1b around its periphery (as seen in Figure 2), and along its rear edge may be hinged to a lower enclosure 2, the front of the base plate normally resting on a bracket 2a extending inwardly from the front of that enclosure. Extending upwardly from the base plate 1 are the lefthand and righthand standards 5 and 6, respectively, and the intermediate standard 7, these standards serving to support various elements of the phonograph as hereinafter appears.

Journalled in the standard 7 is a mandrel shaft 9 on which, to the right of that standard, is carried a record support in the form of a generally cylindrical mandrel 10; this may for example be of the form disclosed in U. S. Patent No. 2,010,717, issued August 6, 1935, on application of H. F. M. Gramann. For purposes of the instant description some of the elements of the mandrel, all rotationally secure with respect to the shaft 9, may be noted as comprising a main cylindrical shell 11; the flanged ejecting head 13 at the left of the shell 11, limitedly movable axially of the mandrel and rightwardly biased (as purely schematically indicated by the spring S'); the expansible chuck members 14 at the right of the shell 11; and the righthand end knob 15. The mandrel is adapted to receive a cylindrical record R, purely typically of a wax composition, which may be slid leftwardly over the shell 11 until the lefthand extremity of the record impinges against the head 13; further leftward movement of the record moves the head 13 leftwardly against its bias, until a suitable mechanism (including the bevelled surface 15' at the leftward extremity of knob 15) expands the chuck members 14 to internally grip the righthand end of the record and thus to maintain the record mounted as shown in Figure 1. With the record so mounted, a slight leftward movement of the knob 15 collapses the chuck members 14 and permits the ejecting head 13 to obey its bias and to eject the record rightwardly.

The mandrel shaft 9 extends to the left of standard 7 toward a driving pulley 17 rotatably mounted at the right of standard 5, the pulley 17 being rotated as by a belt 16 and motor M shown in dash-dot lines in Figure 6. Secured to the pulley 17, and splined on the end portion of the shaft 9, are the respective elements 18 and 19 of a clutch 20. The element 19 is provided with an annular groove 19', in which there are positioned a pair of pins 21 secured in the upper extremities of a clutch operating yoke 22, the latter being pivoted to a stationary U-shaped bracket 22b. One of the arms of this yoke is extended below the base plate 1, here suitably apertured as indicated at 1c in Figure 1, to have ts lower extremity connected as by rod 22a to a clutch-operating magnet assembly hereinafter mentioned.

Above and behind the mandrel 10 there extend, between the standards 5 and 6, the respective carriage rods 23 and 24, along which there is slidable a carriage 40. The carriage extends forwardly over the mandrel, and carries in its forward portion a translating device 30 arranged, in manner hereinafter more detailedly apparent, for co-operation with the record R on the mandrel. The carriage may be driven rightwardly along the rods 23 and 24 by a feed screw 25, journalled between standards 5 and 6 behind the rod 23, and engageable by a feed nut 27 carried in the carriage. The feed screw 25 may be rotated, by a train of gears 26 coupling it rotationally with the mandrel shaft 9, coincidentally with mandrel rotation.

It will be understood that the mandrel 10 and carriage 40 form a drivable system for producing translation-effecting relative movement between the record R and the translating device 30—e. g., a movement which causes either of the translating device styli (hereinafter mentioned) to traverse a spiral path on the record, for the translation of oscillatory energy into a recording on the record or vice versa. And while the described translation-effecting movement is the movement appropriate to the type of record and type of phonograph which I have chosen for illustrative purposes, I intend no unnecessary limitation whatsoever as to those types or as to the nature of that movement.

While the translating device 30 may in recordation be actuated by, and may in reproduction produce, oscillatory energy of any of a wide variety of natures, I have shown it as provided with an upwardly extending neck 29 (see Figure 1), to which a sound-conveying tube 28 may be attached for the conveyance of sound energy to and from the translating device. Not all the details of the translating device are necessary to an understanding of the present invention; but, with particular reference to Figure 3, it may be pointed out that the illustrated device includes two circular members pivoted (as at point P) at the front of the device and extending generally rearwardly, the upper of these members being designated as 31 and the lower as 32. When both members are free of upward restraint, a smooth ball 34 attached to member 32 contacts the record surface, without effect on the latter, and a recording stylus 35 carried by the upper member 31 also contacts the record surface; the translating device is then conditioned for recordation on the record—e. g., for the engraving in the record surface of a groove of depth undulating in accordance with sound energy supplied to the device through the tube 28. When the upper member 31 only is held upwardly (as by means hereinafter described) both the ball 34 and the recording stylus 35 are held away from the record, and a reproducing stylus 36, suitably carried by the member 32, is brought into contact with the record surface; the translating device is then conditioned for reproduction from the record— e. g., for the emission through the tube 28 of sound energy translated by the device from an undulating record groove being traversed by the reproducing stylus 36. When both members 31 and 32 are held upwardly (as by means hereinafter described) the ball 34 and both the styli 35 and 36 are held away from the record; the translating device is then in neutral condition.

Without implying any unexpressed limitation thereto, I may mention, as one form of translating device with which my invention may be employed, a sound box of the type shown in U. S. Patent No. 1,989,198, issued January 29, 1935, on application of Charles Heunlich, and in which will be found elements corresponding to those described in the preceding paragraph.

The means for variously positioning the circular members 31 and 32, and thus for selectively conditioning the translating device, comprise two lugs 37 and 38 extending rearwardly from those members respectively; two arms 45 and 46 carried in the carriage and having their forward extremities respectively underneath those lugs; a translating device control lever 39 pivoted on a horizontal stud 39' at the righthand side of the carriage and extending forwardly from that stud;
and a mechanism rendering the arms 45 and 46 responsive to the angular position of the control lever 39 about the stud 39'. This mechanism is best seen in Figures 3 and 4.

In its central portion the carriage 40 includes the vertical side members 41 and 42, and a sleeve 43 extending between those side members and to the left of member 41 about carriage rod 23 and acting as a long bearing for the carriage about that rod. Between the side members 41 and 42, behind the sleeve 43, is secured a cross rod 44. The forwardly extending ears 47 and 48 of a U-shaped member 49 are pivotally mounted on this rod 44 just inside 41 and 42. Rotatably surrounding the rod 44 between the ears 47 and

48 are a series of three collars 51, 50, 52; the arm 45 is secured to the righthand side of the lefthand collar 51, while the arm 46 is secured to the lefthand side of the righthand collar 52, so that the arms may rotate about rod 44. The principal portion of each of the arms 45 and 46 extends downwardly and forwardly from rod 44; but each arm also extends a short distance upwardly from rod 4, to be engaged by the forward extremity of a respective tension spring, shown as 54 for arm 46. The rear extremities of these springs are secured to a stationary cross rod 55 (at the rear of the carriage) to bias upwardly the front extremities of the arms 45 and 46; this arm bias of course tends to cause the raising of both the circular members 31 and 32, and hence tends to establish a neutral condition of the translating device 30.

The arms 45 and 46 are moved against their biases, to variously condition the translating device, by respective small rollers 57 and 58 movable along specially formed intermediate top surfaces of those arms. To support these rollers there rotatably surrounds the sleeve 43, between the carriage side members 41 and 42, a centrally apertured block 60; from this block there extend generally downwardly lefthand and righthand ears 61 and 62; and between these ears there extends a thin cross pin 59 on which the rollers 57 and 58 are positioned, with a third roller 56 therebetween. When the block 60 occupies the angular position about sleeve 43 in which it is illustrated in Figure 3, the aligned rollers 57 and 58 will respectively be in contact with top surface portions of the two arms, that portion for the arm 46 having been designated as 46''. The configurations of the top surfaces of the arms are such that the forward arm extremities are then in a raised position, and the translating device 30 is therefore in a neutral condition.

From the portions typified by 46'' toward the pivoting rod 44 to the top surfaces of the arms 45 and 46 extend (similarly, and as indicated by the arm 46 in Figure 3) more nearly vertically than the rearward arcuate path traversed by the rollers upon rotation (counter-clockwise as viewed in Figure 3) of the block 60. Accordingly upon such rotation (for example to bring the rollers into slight indentations indicated as 46' for the arm 46) the arms will be rocked about rod 44 to bring their forward extremities downwardly; this results in a lowering of both circular members 31 and 32 and therefore conditions the translating device 30 for recordation.

From the portions typified by 46'' the top arm surfaces extend forwardly with different elevational configurations. That of arm 45 extends a distance forwardly (for example to the slight indentation 45''') approximately along the forward arcuate path traversed by the rollers 57 and 58 upon the rotation (clockwise as viewed in Figure 3) of block 60; while that of arm 46 extends (for example to the slight indentation 46''') materially more upwardly than that forward arcuate path. Accordingly upon such rotation (for example to bring the rollers into the indentations 45''' and 46''') the arm 45 will be left approximately in its Figure 3 position, while the arm 46 will be rocked to move its forward extremity downwardly; this results in a lowering of the circular member 32 but a maintenance of the member 31 raised, and therefore conditions the translating device for reproduction.

It is desirable that the feed nut 27 be disengaged from the feed screw 25 throughout a neutral condition, but engaged therewith during either translation condition (i. e., for recordation or reproduction), of the translating device. Accordingly the feed-nut may be mounted, above the feed screw, on the bottom of a horizontal rearward extension 68 formed from the top edge of the U-shaped member 49 abovementioned; and from the bottom edge of the U-shaped member 49 there may be formed downwardly the extension 64, an arm 65 being in turn folded forwardly from the lower portion of 64 to pass underneath the central roller 56. The arm 65 is biased upwardly, to force its top surface against that roller, by a strong spring 66 tensioned between an upward extension 47' of the ear 47 and the cross rod 55. The portion of the top surface of arm 65 bearing against roller 56 when the translating device is in neutral condition is illustrated as 65''; and when this bears against the roller the feed nut 27 is held raised from the feed screw 25. From this portion there slope downwardly the rearward and forward top surface portions 65a and 65b; and as the block 60 is rotated to move the rollers either rearwardly or forwardly, for adjustment of the translating device into either recordation or reproduction condition, the roller 56 travels over the surface portion 65a or 65b, the arm 65 moves upwardly in response to its bias, and the feed nut 27 is rocked downwardly into contact with the feed screw 25.

The angular position of block 60, and hence the condition of the translating device and the engagement of the feed nut, is made responsive to the angular position of the control lever 39, and vice versa. A pin 69 is extended rightwardly from the righthand block ear 62, through an arcuate aperture 42' in the righthand carriage side member 42. A link 70 is pivotally secured to this pin, and extends forwardly therefrom to have its forward extremity pivotally secured to the bottom of a short arm 39'' integral with and extending downwardly from the control lever 39. It will be obvious that a downward position of the control lever will be accompanied by a conditioning of the translating device for recordation, an intermediate lever position (as illustrated in Figure 2) by a neutral condition of the translating device, and an upward lever position by a conditioning of the device for reproduction.

For purposes hereinafter apparent there are provided, in addition to the manually operable lever 39, two other levers to the positions of which the angular position of block 60 is responsive, and vice versa. One of these levers, designated as 72, is secured in the top of the block 60 and extends upwardly therefrom through an aperture 71 in the top of the carriage; the direct correspondence of its angular position with that of block 60 will be obvious. The other of these levers, designated as 73, is secured to and extends upwardly from the rod 23 near its lefthand extremity; the rod 23 is rotatably held between the end standards and the block 60 is splined thereto (by a screw 60a passing through an elongated aperture 43a in sleeve 43 into a longitudinal groove 23a in the rod) to render the angular position of the lever 73 correspondent with that of. the block 60. Both levers 72 and 73 may for example be vertical when the translating device is in neutral condition, may be rocked forwardly of vertical in the conditioning of the device for recordation, and may be rocked rearwardly of vertical in the conditioning of the device for reproduction.

It is common, in phonographs of the general type described, to employ with each record an individual "index" blank, for example in the form of a slip, which is inserted in appropriate position in the machine and upon or in which there may be made annotations indicating points of error and/or correction in the recordation, lengths of dictation sequences, and the like—the slip being removed with the record and employed in later transcription from that record for the guidance of the transcriber. In the figures there has been shown a holder 80 for such an index slip, disposed just above the front of the base plate 1 below and forward of the mandrel 10. The holder may consist of a slightly inclined flat plate having folded-over front and back flanges 79, and held to the front flange 1b of the base plate by a long bracket 78 seen in Figure 6. At the front corners of the base plate 1, to the left and right of the holder 80, the base plate may be formed upwardly into the inclined surfaces 75 and 76 substantially aligned with the holder; an index slip S may be slid leftwardly over the surface 76 into the holder 80, the lefthand portion of the surface 76 being desirably provided with an indentation 77 for the accommodation of the finger in the completion of insertion of the slip. While any means for relating points in the recording to points on the index slip may be employed, I have illustrated a simple pointer 74 extending downwardly from the front of the carriage 40 and then forwardly over the index slip; this pointer, travelling longitudinally of the slip in accordance with the travel of the translating device longitudinally of the record, may be employed as a guide for pencil marks or the like on the slip.

I have found that I may greatly simplify the operation of the phonograph by appropriately relating various functions of the phonograph to the operation of change of the index slip S, for example causing that change to control those functions, or to actuate automatic means whereby those functions are performed. Thus I may cause the operation of slip removal from the holder to automatically return the carriage 40, from the position to which it has been driven rightwardly during recordation (or reproduction) to an initial (or extreme leftward) position of readiness for recordation (or reproduction) on a fresh record. I may also cause the slip removal first to automatically place the translating device in neutral condition, thereby obviating record contact by either stylus during the carriage return. Further, I may cause the operation of slip insertion in the holder to automatically condition the translating device for recordation; the lowering of the recording stylus onto the record is thereby automatically occasioned before any start of record rotation, obviating any tendencies toward chattering such as may possibly occur if the stylus is too rapidly lowered onto a rotating record.

In carrying out these automatic operations it is desirable that the system enforce the mounting of a record on the mandrel before the insertion of the accompanying slip in the holder, so that, among other things, the automatic lowering of the recording stylus shall not occur without a record in place. This I may accomplish by a mechanism interfering with the insertion of the slip excepting when a record is mounted on the mandrel. It is further desirable that the carriage be in initial position before the slip is inserted, so that, among other things, the automatic lowering of the stylus shall occur at the position appropriate to the beginning of recordation on the fresh record; and it is further desirable that the system shall have enforced the delay of removal of the prior record until after the removal of the accompanying slip, so that, among other things, the automatic placing of the styli out of record engagement (by that slip removal) shall have occurred before the record was disturbed. These last two specifications I may conveniently meet by means interfering with the removal of the record until the carriage return (automatically effected by slip removal) has been completed.

The mechanism interfering with the slip insertion is best seen in Figures 1, 2, 6 and 11. It may comprise a generally front-and-back-extending lever 90 pivoted on a horizontal stud 91 extending rightwardly from the lower front corner portion of the standard 7, the forward portion of the lever being curved upwardly underneath the holder 80 and into the righthand extreme portion of an aperture 80a cut into the holder for an appreciable distance from its lefthand extremity. From the stud 91 the lever 90 extends rearwardly to below the axis of the mandrel 10; it is there formed rightwardly into the lug 93, the top of this lug having a righthand portion higher than its lefthand portion and joined therewith by an inclined cam surface 94. When a record is fully mounted on the mandrel (as shown in Figures 1 and 11) the flanged ejecting head 13 of the mandrel is disposed above the lug 93 to the left of the cam surface 94, the forward portion of the lever is permitted to drop into contact with the base plate 1 (for example in response to the influence of gravity on this lever portion and if desired on a weight 95 secured thereto), and the front lever extremity 92 is at least as low as the level of the top surface of holder 80. When the record is removed from the mandrel, however, the ejecting head 13 in its attendant rightward movement (to a position such as shown in dash-dot lines in Figure 11) will move against and along the cam surface 94, forcing the rearward lever portion downwardly, and the front lever extremity 92 upwardly to intercept the path traversed by an index slip during its insertion into the holder. This effectively prevents the insertion of a slip while no record is on the mandrel.

The means interfering with record removal until the carriage has been returned to its initial position is best seen in Figures 1, 5 and 2. It may comprise a flat bar 96 extending in a side-to-side direction slightly above the forward part of the rear base plate portion 1'; it is held thereto, for limited longitudinal movement, by studs 99 passing through respective elongated slots 98 near the ends of the bar. Pivoted about the righthand one of the studs 99, between the bar 96 and the base plate, is a lever 100 extending from that stud generally rightwardly and having a righthand end portion 101 curving forwardly at about the level of the mandrel axis to terminate close to the bevelled surface 15' at the left of the mandrel knob 15—it being understood that this end portion 101 when in the described position will prevent the leftward knob movement required for record ejection. From its pivot the lever 100 is provided with the rearwardly extending lug portion 102; above this lug portion 102 the bar 96 is provided with a rearwardly extending lug portion 97; and these two lug portions are connected together a little behind the stud 99, as by a pin 103 extending downwardly from the lug portion 97 into a slightly oversize hole 102a in the lug portion 102. This connection is disposed so that when the bar 96 is in its rightward position the lever end portion 101 is in its described interfering position; and the bar and lever are biased to those positions, as by a spring 104 tensioned rightwardly from the lug portion 102 to a pin 105 in the base plate. (In view of the slightly oversize nature of the hole 102a, a stop pin 106 may be abutted against by the lug portion 102 to accurately establish the normal or interfering position of the lever end portion 101.) It will be understood that leftward movement of the bar 96, against its bias, will cause the lever 100 to rock rearwardly about its stud 99 to remove the interference with the operation of the record-ejecting knob 15. Independently of its interference with operation of the knob 15, the lever portion 101 normally directly obstructs the passage of a record R off from or onto the mandrel; and it will be understood that by the leftward movement of bar 96 the lever 100 will be rocked rearwardly sufficiently to remove this obstruction as well as the interference with knob operation.

The bar 96 is moved leftwardly only when the carriage comes into its initial position—which position may be taken as one wherein the rear portion of the lefthand carriage side member 41 abuts against a collar 24b secured on the rear carriage rod 24 near the lefthand extremity of the latter. To effect this movement the lefthand extremity of the bar 96 is folded upwardly into a vertical lug 108, from which a pin 109 extends a short distance rightwardly; and a lever 110 hangs downwardly from the carriage to impinge upon this pin, and to move it and the bar 96 leftwardly, in the terminal portion of carriage-returning movement. The lever 110, best seen in elevation in Figure 2, is mounted on a stud 113 extending rightwardly from the righthand carriage side member 42.

The suspension of interference with record removal (or mounting) when the carriage is in its initial position is desirably limited to a neutral condition of the translating device—for it is obviously undesirable that the record be manipulated if the translating device be conditioned for recordation or reproduction. To effect this limitation the lever 110 is pivotally mounted on the stud 113; and its top extremity is connected by a link 114 with a short lug 70a extending downwardly from link 70 (above seen to be moved in accordance with the conditioning of the translating device). Accordingly the lever is rocked to bring its lower extremity out of line with the pin 109 (either rearwardly or forwardly) when the translating device is placed in either recordation or reproduction condition; and in either case, although the carriage be in initial position, the bar 96 will be permitted to respond to its rightward bias and the interference with record manipulation will be restored. If from either of those conditions the translating device (still in initial position) be restored to neutral condition, it is desirable that the bar 96 be moved leftwardly again to suspend the interference; and this may be accomplished by the provision of short vertical camming lugs 111 and 112 at the lower extremity of lever 110—the lug 111 leading diagonally forwardly and rightwardly, and the lug 112 diagonally rearwardly and rightwardly, from that lever extremity.

While the control by the index slip of the abovementioned means for automatically performing various functions in the phonograph may be effected in any of a variety of manners, I have preferred in general to employ an electrical control thereof. For this control I may provide a pair of electrical switches in suitable association with the slip holder 80. These switches may be contained within a housing 81, for example molded of insulating material, seen in Figures 1, 2 and 6 in position in the phonograph, and illustrated in detail in Figures 7 through 10. The righthand portion of this housing is disposed within the holder aperture 80a abovementioned, immediately to the left of the interfering lever extremity 92 abovementioned, while the lefthand portion of the housing may be disposed within a slot 75a cut into the inclined surface 75 of the base plate 1. The housing may comprise a generally rectangular box 82, having the vertical partition 83 extending for a major portion of its length leftwardly from its righthand extremity. Of the vertical dimension of the housing about half is disposed above and half below the plane of the index slip S (the term "vertical" being here employed to denote right-angularity to the slightly inclined plane of the slip); and in this plane the entire housing, including the vertical central partition 83, may be provided with a slot 84 leading leftwardly from the righthand housing extremity for about half the length of the housing—the slot 84 serving to admit the slip, and its lefthand extremity serving to define the fully inserted position of the slip. A cover 89 of insulating material may be provided for the housing, screws 89a for example serving to hold the cover and the entire housing in place.

In the rear portion of the housing 81 is provided a closely-biased switch 85 comprising a pair of leaf springs 86 having lefthand terminal portions held in an insulating stack 85a, and extending rightwardly therefrom respectively above and below the plane of the slip S. Near their righthand extremities the springs are bent to touch each other in the absence of the slip; but they are provided at their extremities with the divergent cam portions 86'. A slip S, impinging on these cam portions during its insertion, forces the springs apart and passes therebetween, thereby (in view of the insulating nature of the slip material) effectively opening the switch 85 and holding it open so long as the slip remains inserted. In the forward portion of the housing is an openly-biased switch 87 comprising a lower leaf spring 87' and an upper leaf spring 88, these springs having lefthand terminal portions held in an insulating stack 87a and extending therefrom rightwardly for a distance somewhat less than the rightward extension of springs 86 abovementioned. Near its righthand extremity the upper spring 88 is bent to have a high point 88', a cam surface 88'' extending diagonally rightwardly and downwardly therefrom through the plane of the slip S, and a terminal portion 88''' slightly out of contact with lower spring 87' in the absence of a slip. A slip S, impinging on the cam surface 88'' during its insertion (and after having opened the switch 85), will force the spring 88 downwardly and will pass above the high point 88', thereby closing the switch 87 and holding it closed so long as the slip remains inserted.

Figure 16 schematically illustrates an electrical circuit which may be employed for the phonograph and wherein the switches 85 and 87 are incorporated. It includes a pair of conductors 121 and 122, connectable to a power supply as by a plug 120. The motor M is connected between these conductors through a closedly biased switch 119, which may be opened by the hanging of the sound-conveying tube 28 on a pivoted hook 118 suitably associated with the switch. (Mechanically this hook is fractionally shown in Figures 1 and 6, pivoted on a horizontal pin extending across an aperture 75b in the base plate portion 75, and bearing downwardly on a switch-operating plunger 119a through the intermediary of a lever 116, the lever being pivoted to a lug 115 which extends downwardly from the base plate 1.) The conductors 121 and 122 also lead to a system for the control of the mandrel and feed screw rotation, comprising a single-pole double-throw switch 123 and a magnet assembly 130. The magnet assembly, which may be of the form disclosed in U. S. Patent No. 1,380,486, to Langley and therein more fully described, may comprise a pair of "start" coils 131, a pair of "stop" coils 132, and an armature system 133 shiftable by the coils; these components are mechanically seen in Figure 1, the clutch-operating rod 22a above-mentioned being connected to the armature system 133 to render the clutch 20 responsive to the assembly. As seen in the electrical showing of Figure 16, the conductor 121 is connected selectively to the two sets of coils through a switch pole 134 associated and moved with the armature system 133; this pole selectively touches contacts 135 and 136, in series respectively with the start coils 131 and stop coils 132. The arrangement is such that upon the energization of either set of coils the armature (together with the clutch element 19) is moved appropriately to the coils energized, and simultaneously the pole 134 is thrown to touch the contact in series with the other coils; this automatically breaks the circuit of the energized coils (limiting their energizations to momentary ones) and prepares the circuit of the other coils for energization. The two sets of coils are selectively subjected to these energizations by connection thereto of the conductor 122 through the switch 123; that conductor is connected to the pole 124 of the switch, and the start and stop coils 131 and 132 are respectively connected to the run contact 125 and to the stop contact 126 of the switch. The switch 123 may be carried in a recess 127 provided in a mouth-piece 128 in which the sound-conveying tube 28 terminates; the pole 124 may be biased to touch the stop contact 126, but may be thrown to touch the run contact 125 by pressure on a pivoted cover 129 provided over the recess 127.

It may be noted that Figure 16 illustrates typical conditions obtaining during the operation of the phonograph for recordation; it therefore shows the switches 85 and 87 in the conditions they assume when the slip S is fully inserted in the holder 80, and the switch pole 124 thrown to touch the run contact 125.

For automatically placing the translating device in neutral condition by the removal of the slip S, I connect between conductors 121 and 122 a circuit serially comprising the closely biased switch 85 and a solenoid system 140 which, when energized under a condition of the translating device for either recordation or reproduction, will immediately place the translating device in neutral condition—the solenoid system simultaneously open-circuiting itself so that, among other things, wasteful continued current flow therein will be avoided. Mechanically this solenoid system is illustrated in Figures 1 and 2. It may comprise a coil 141 having a front-and-back extending axis; a rectangular frame 142 of magnetic material surrounding and supporting the coil, mounted on a horizontal platform 143 which extends rearwardly from the relatively high central carriage portion above the relatively lower rear carriage portion, and apertured axially of the coil; a magnetic plunger 144 movable axially of the coil therewithin; and a switch assembly 145 secured behind the frame 142 and operated by the plunger 144, the casing 145a of the switch assembly appearing in Figures 1 and 2. The forward end of the plunger is bifurcated, and to it is pivotally connected the rear extremity of a rod 72a; to the forward extremity of this rod is adjustably secured a U-shaped member 72b, which is pivotally connected to the top of the lever 72 abovementioned. Thus the position of the plunger axially of the coil corresponds with the condition of the translating device, being forward for a recordation condition, intermediate for a neutral condition, and rearward for a reproduction condition. The components are apportioned and adjusted so that the intermediate plunger position will be one wherein it is longitudinally centered or symmetrically disposed with respect to the coil 141.

As seen in the electrical showing of Figure 16, the switch assembly 145 comprises a pole 146 moved by the plunger, a pair of contacts 147a—147b connected together by the pole 146 when the plunger is in forward position, and a pair of contacts 148a—148b connected together by the pole 146 when the plunger is in rearward position. Contacts 147a and 148a are connected together to form one electrical side, and contacts 147b and 148b are connected together to form the other electrical side, of the switch assembly 145, and this is electrically placed in series with the coil 141. Thus when the lever 72 is vertically disposed, the translating device in neutral condition, and the plunger 144 axially centralized within the coil 141, the switch assembly 145 serves to maintain the coil open-circuited so that it cannot be energized. But if the translating device be in either recordation or reproduction condition, and the plunger 144 thus decentralized forwardly (as in Figure 16) or rearwardly with respect to the coil 141, that coil will not be open-circuited at the switch assembly 145; then if the switch 85 be closed by removal of the index slip, the coil 141 will be energized to move the plunger 144 into centralized position, placing the translating device in neutral condition and open-circuiting the coil. And so long as no slip is in the holder and the switch 85 therefore remains closed, any attempt to place the translating device in recordation or reproduction condition will, in view of its re-closing of the coil circuit at the switch assembly 145, be followed by an immediate restoration to neutral condition; thus there is prevented an effective conditioning of the translating device for recordation or reproduction while no slip S is in the holder 80.

The solenoid system 140 constitutes a yieldable means biasing the translating device into neutral condition while no slip is in the holder. Since slip removal is an incident of record removal, that system is likewise a biasing means rendered effective as an incident of record removal; and the means which prevents the insertion of a slip until after subsequent record mounting acts to positively maintain the biasing means effective until after that mounting.

While the automatic returning of the carriage to its initial position by the removal of the index slip may be performed in any of a variety of ways, I have preferred for simplicity to employ a carriage-returning means which operates automatically in response to placement of the translating device in neutral condition (which placement has just been seen to be effected by slip removal.) This means I have shown in the simple form of a means biasing the carriage toward its initial position. As best seen in Figures 6 and 12, it may comprise a biasing drum 150 rotatably mounted about a vertical shaft 151, the shaft extending upwardly from a horizontal platform 152 which is secured to and extends rightwardly from the lower rear portion of the standard 5; a torsion spring 153 within the drum biasing the drum to clockwise rotation as viewed from the top; and a flexible band 154 having one end secured to the outer periphery of the drum and its other end secured to the lefthand side of the carriage 40 (underneath the feed screw 25), and adapted to be rolled up on the drum in obedience to the bias of the latter. A top plate 155, secured on the top of the shaft 151, may cover the drum assembly.

It will be understood that so long as the translating device is conditioned for either recordation or reproduction, the attendant engagement of the feed nut 27 with the feed screw 25 will render the biasing drum ineffective to return the carriage; and, although a shift of the translating device from one of those conditions to the other will temporarily disengage the feed nut as neutral condition is passed through, nevertheless if that shift is rapidly performed there will be insufficient opportunity for any effect of the biasing drum to occur. But if the translating device be shifted into neutral condition (as by slip removal as described above, for example), then, unless the carriage be manually restrained, the biasing drum will act to roll up the band 154 and thus to return the carriage to its initial position.

For automatically placing the translating device in recordation condition by the insertion of the index slip, I connect between the conductors 121 and 122 a circuit serially comprising the openly biased switch 87 and a solenoid system 160 which, (when energized under a neutral or reproduction condition of the translating device, will immediately place the translating device in recordation condition—the solenoid system simultaneously open-circuiting itself. Mechanically this solenoid system is illustrated in Figure 1. It may comprise a coil 161 having a front-and-back extending axis; a rectangular frame 162 of magnetic material surrounding and supporting the coil 161, mounted on a shelf 163 which extends rightwardly from the top of the standard 5, and apertured axially of the coil; a magnetic plunger 164 movable axially of the coil therewithin; and a switch assembly 165 secured behind the frame 162 and operated by the plunger 164, the casing 165a of the switch assembly appearing in Figure 1. To the forward end of the plunger is pivotally connected the rear extremity of a rod 73a; to the forward extremity of this rod is adjustably secured a U-shaped member 73b, which is pivotally connected to the top of the lever 73 abovementioned. Thus the position of the plunger 164 axially of the coil 161 corresponds with the condition of the translating device, in the same manner as that of the plunger 144 abovementioned—excepting that the forward position of the plunger 164, corresponding with a recordation condition, is the position wherein that plunger is longitudinally centralized or symmetrically disposed with respect to its coil 161, and into which it will be attracted by coil energization.

As seen in the electrical showing of Figure 16, the switch assembly 165 includes a pole 166 moved by the plunger 164, and a pair of contacts 167 connected together by the pole 166 when the plunger is in its intermediate position but not connected together when the plunger is in either its forward or rearward position; these contacts are connected in series with the coil 161, for example between that coil and the conductor 122. Accordingly when the lever 73 is forwardly inclined, the translating device in recordation condition, and the plunger 164 in its forward position axially centralized within the coil, the switch assembly 165 serves to maintain the coil open-circuited so that it cannot be energized; this is also true when the lever 73 is rearwardly inclined, the translating device in reproduction condition, and the plunger 164 in its rearward position. But if the lever 73 be vertical, the translating device in neutral condition, and the plunger 164 thus decentralized to its intermediate position, then the coil 161 will not be open-circuited at the switch assembly 165; then if the switch 87 be closed by insertion of the index slip in its holder 80, that coil will be energized to move the plunger 164 into its centralized (forward) posiiton, placing the translating device in recordation condition and open-circuiting the coil. And so long as the slip remains in the holder 80, the translating device may only manually be maintained in neutral condition, since the circuit of coil 161 will then be re-closed and the coil thus energized to urge the assumption of recordation condition; but a reproduction condition of the translating device, established manually against the force of the solenoid system, will of course be freely maintained, since it entails the open-circuiting of the coil at the switch assembly 165.

There may be reviewed the sequence of operations beginning at a time when it is desired to remove a record from the mandrel. The operator, positively required to remove the slip S before removing the record, removes the slip; automatically the translating device, whether it had been in recordation or reproduction condition, is placed in neutral condition, the carriage is returned, the translating device remains (being in effect biased by the solenoid system 160 against other conditions) in neutral condition, and the interference with record removal is done away with. The operator then removes the record. Positively required to mount a record on the mandrel before fully inserting a new slip, he mounts the record and then inserts the slip; the translating device, which had been left in neutral condition, is automatically placed in condition for recordation on the newly mounted record. (In the special case wherein the operator desires to reproduce from the newly mounted record, he will simply manually shift the translating device, as by the lever 39, from recordation into reproduction position.) At any time during recordation that he wishes to listen back to recorded matter, he shifts the translating device into neutral condition, as by the lever 39, and returns the carriage leftwardly for the desired distance (while manually resisting the mild forces urging the translating device into recordation condition and the carriage into full initial position), finally shifting the translating device into reproduction condition at the desired point. Restoration from reproduction condition to recordation condition may be simply effected, without an undesired carriage shift, by a rapid throw of the lever 39 from the one to the other position, the terminal and major portion of which shift will be aided by the force of the solenoid system 160.

I have thus far described an embodiment of my invention wherein there are not needed certain mechanical components shown in the drawings and not yet described; I shall now proceed to disclose the elaborations involved in a preferred embodiment of the invention, wherein those additional components are employed, and wherein the electrical circuit may be elaborated from that shown in Figure 16 to that shown in Figure 17.

This preferred embodiment employs an advance device, for determining whether the carriage (or translating device) is in a position of farthest advance, or is in a less advanced position as a result of a backspacing operation such as is performed from time to time for purposes of reproduction of (or listening back to) previously recorded matter. With the advance device, as will hereinafter appear, are incorporated means for preventing operation of the phonograph with a recordation, or other than a reproduction, condition of the translating device while the carriage is at all backspaced from its position of farthest advance; means for automatically stopping the phonograph, and thereafter shifting the translating device into recordation condition, when the carriage after backspacing is brought up to its position of prior farthest advance; and means for preventing operation of the phonograph with a reproduction, or other than a recordation, condition of the translating device while the carriage is in any position of farthest advance. While not limitatively, the solenoid systems 140 and 160 (the latter minutely modified and designated as 160') are advantageously employed in the performance of these new functions, and coincidentally in the performance of substantially the functions already described for them.

While my invention is not at all limited as to any particular form of advance device, I have preferred to employ therein an advance device of the rotary, carried-in-the-carriage type disclosed and claimed in the co-pending application of Louis Z. La Forest, Serial No. 237,648, filed October 29, 1938, and assigned to the assignee of this application.

The advance device, designated generally as 180, is particularly illustrated in Figures 2 and 13 through 15; it is disposed about the rear carriage rod 24, between the carriage side members 41 and 42. It comprises the following elements, all surrounding and co-axial with the rod 24: a rotarily stationary cup-shaped member 181 of insulating material, having its base centrally apertured and secured to the lefthand surface of the righthand carriage side member 42; a collar 182 adapted to be rotated about the rod 24 as hereinafter described, extending leftwardly for a distance from the righthand side member 42; a disc 183 secured to the lefthand surface of the collar 182 and provided with a horizontal pin 184 extending a short distance leftwardly from a point near its periphery; a spacing collar 185 immediately to the left of the disc 183; a ratchet wheel 186 immediately to the left of the collar 185, provided with a rightwardly extending pin 187 adapted to be contacted and moved by the pin 184 for rotation of the wheel by the disc 183; a collar 188 secured to the lefthand surface of the wheel 186 and extending therefrom to the lefthand carriage side member 41 to provide a good bearing for the wheel; and a spiral spring 189 having one end secured to the wheel 186, wound around the collar 188, secured at its other end to the carriage side member 41, and biasing the wheel counterclockwise (as seen in Figure 2) to contact of its pin 187 with the disc pin 184.

The collar 182 and disc 183 are subjected to rotation about rod 24 in relative correspondence, as to both direction and degree, with the longitudinal travel of the carriage; this is done by a key 182a passing inwardly through the collar 182 into engagement with a spiral groove 24a cut into the rod 24 and executing not more than one full convolution in the length of carriage travel along that rod. Thus the angular position of the pin 184 about the rod 24 precisely defines the longitudinal position of the carriage. If always permitted to respond to its bias, the ratchet wheel 186 would always keep its pin 187 in contact with the disc pin 184; but counterclockwise wheel rotation (as seen in Figure 2, and corresponding to returning or leftward carriage movement) is normally prevented by the engagement with the finely toothed wheel periphery of a pawl 200. Thus the angular position of the pin 187 about the rod 24 defines the position of farthest advance attained by the carriage. Strictly this may be stated as the farthest advance attained since the last preceding release of the pawl from engagement with the wheel 186. But, as will hereinafter be seen, the release of the pawl may be and is preferably made to occur only when the index slip S is removed and the carriage coincidentally restored to its initial position; and since slip removal is in turn a normal incident of record change and only of record change, the practical significance of the term "farthest advance" is farthest advance relative to the particular record on the mandrel at any time.

It will be understood that so long as the carriage has not been backspaced relative to the mounted record, then, whether the carriage has been advanced much or little or not at all, the actual position of the carriage may be considered its position of farthest advance. But if the carriage has been backspaced and not fully re-advanced to the position from which the backspacing was effected, then it is not in a position of farthest advance; and under these circumstances the pin 184 will be out of contact with the pin 187 (having been retracted counterclockwise from the then-stationary latter pin, to a degree depending on the distance of backspacing), and will again come into contact therewith only when the carriage has again attained a position of farthest advance—i. e., its prior such position.

In the advance device there is incorporated an electrical switch 190 selectively thrown to its respective conditions according to whether the carriage is or is not in a position of farthest advance; this switch is made responsive simply to the angular relation between the disc 183 and the wheel 186 (which is the same relation as that between the pins 184 and 187 just discussed). The switch 190 may for example comprise a pair of coaxial, spaced conductive rings 191 inset into the inner annular surface of the cup-shaped insulating member 181, and means responsive to the abovementioned angular relation for connecting and disconnecting the rings to and from each other. This means may comprise a pair of lugs 192 extending rightwardly from the wheel 186 near its periphery; an arm 193 pivotally mounted between the lugs 192, extending rightwardly therefrom to beyond the disc 183, and having a foot portion 194 extending toward the rod 24 adjacent the wheel 186; a ring-shorting brush 195 carried by the arm 193 opposite the rings 191; a biasing spring 196 for the arm 193, secured to the wheel 186 and overlapping the foot portion 194, and biasing the brush 195 away from the rings 191; a triangular projection 193a extending inwardly from the arm 193 toward the periphery of disc 183; and a triangular projection 183a extending outwardly from that disc periphery. The components are so arranged angularly that as the pins 184 and 187 come into contact with each other the projection 183a will cam against and come into alignment with the projection 193a, forcing the arm 193 outwardly against its bias sufficiently to press the brush 195 against the conductive rings 191. Thus the switch is closed when the carriage is in any position of farthest advance, but is otherwise open; in other words, it is differentially responsive to a position of farthest advance of the translating device and to a position backspaced therefrom.

Electrical connections to the switch may be made to terminals 199 located on the outside of the insulating cup-shaped member 181 and connected therewithin to the respective conductive rings 191.

As seen in Figures 2, 13 and 14, the pawl 200 may be pivotally mounted between and extend rearwardly from a pair of lugs 201 which extend rearwardly from a cross member 202 provided between the carriage side members 41 and 42 above the forward portion of the advance device 180; the pawl may be biased downwardly, to engage its extremity with the finely toothed periphery of wheel 186, as by gravity. The disengaging mechanism for the pawl may be made responsive to the energization of the solenoid system 140—above seen to be momentarily energized when the slip S is removed from its holder, to be further energizable on occasion while the slip remains removed, but never to be energizable while a slip remains in the holder. To this end the platform 143, on which the solenoid system 140 is mounted, is terminated at about the middle (in a front-and-back direction) of the magnetic frame 142; and the bottom of that frame, behind the platform 143, is provided with the side-to-side-extending gap 142a. Between the folded-down sides 143a of the platform is provided a rotatable cross rod 203; and on this cross rod, just inside the two sides 143a, are secured respective collars 204. To the inner surfaces of the two collars are secured the respective short arms 205a extending rearwardly to the extremities of a substantially horizontal armature 205 attractable by a magnetic field established across the gap 142a. From one of the arms 205a there extends downwardly a lug 206, and a link 207 is pivotally connected to and extends downwardly from this lug; the lower extremity of the link is pivotally connected, through a horizontal spacing collar 208, with a rearward portion of the pawl 200. Thus the pawl and the armature 205 are connected together for substantially vertical movement; the downward bias of both may be augmented, if desired, by a torsion spring 209 surrounding the cross rod 203 and arranged to bias the same to clockwise rotation as seen in Figure 2. The components are apportioned so that when the pawl is engaged with the wheel 186, the armature 205 is spaced below the frame 142; upon energization of the solenoid system 140, however, the armature will be attracted upwardly against the frame 142 by the field across the gap 142a, and the pawl will be released from the wheel 186.

The pawl 200, once disengaged from the wheel 186 as an incident of index slip removal, is maintained disengaged until a slip is re-inserted in the holder 80. This permits the wheel 186 to respond to its biasing spring 189, and to have its pin 187 in contact with the disc pin 184 (and the switch 190 thus closed) at the conclusion of the carriage return which occurs with slip removal; thus the advance device 180 is effectively released from its condition of indicating farthest advance, and is re-conditioned for fresh operation with respect to a newly mounted record.

To maintain the pawl 200 so disengaged, the rotatable cross rod 203 is extended beyond the righthand side 143a of platform 143, and on its end portion is secured a collar 210; to the righthand surface of this collar is secured an arm 211 extending first upwardly and then being folded leftwardly into a short lug 212. A lever 214 is pivoted on a horizontal stud 213 at the top of the righthand carriage side member 42, and extends therefrom rearwardly to terminate in a downwardly directed latch 215; when the armature 205 is in its unattracted position and the pawl 200 engaged, this latch is urged, as by a spring 214a against the top of the lug 212. But when the solenoid system 140 is momentarily energized and the armature 205 upwardly attracted, the lug 212 is rocked forwardly and the latch 215 drops down behind and engages the lug, holding the armature up and the pawl 200 disengaged.

To re-engage the pawl 200 when an index slip is re-inserted in the holder 80, the lever 214 is extended for a short distance diagonally forwardly and upwardly from the stud 213, and is then folded leftwardly into a thin longitudinal arm 216; this passes a little below the plunger rod 72a when the latch 215 rests on the lug 212, and comes into substantial contact with the bottom of the rod when the latch is engaged with that lug. Into the rod 72a is inset a small vertical plate 217 having two spaced, downwardly extending, rounded projections 218; these are respectively just in front of and just behind the arm 216 when the translating device is in neutral condition; and if the latch 215 is engaged with the lug 212 (the pawl being released) the arm 216 substantially touches the bottom of rod 72a between these projections. If now the translating device be automatically shifted into recordation condition by index slip insertion (or be shifted manually into reproduction condition and there held while the slip is inserted), the appropriate one of the projections will cam the arm 216 downwardly, rocking the latch 215 upwardly out of engagement with the lug 212; and since the solenoid system 140 is rendered unenergizable by the slip insertion, the armature 205 will drop downwardly and the pawl 200 will be re-engaged with the wheel 186. (Of course the latch 215 will also be disengaged from the lug 212 by any manual shifting of the translating device, out of neutral condition, which is unaccompanied by index slip insertion; but the solenoid system 140 will be automatically energized by any such shifting, so that the pawl 200 will not then be re-engaged.)

In Figure 17 it will be seen that the solenoid system 160' and its switch assembly 165' are modified from 160 and 165 of Figure 16 by the longitudinal extension of the contacts 167' to be connected together by the pole 166 when the translating device is in reproduction position as well as when in neutral position; this renders the solenoid system 160' available to shift the translating device into recordation condition not only from neutral but also from reproduction condition. When the phonograph is being employed for reproduction after backspacing (the carriage being thus out of a position of farthest advance) the latter shift would be undesired; it is prevented by the serial connection, between the coil 161 and the conductor 121, of the switch 190, which has been seen to be open under the mentioned circumstances.

Without further modification from the circuit of Figure 16, the circuit of Figure 17 would operate to automatically shift the translating device from reproduction condition into recordation condition when the carriage, after backspacing, had come up to its position of prior farthest advance—for the switch 190 would then be closed and the solenoid system 160' thus energized. This, however, would occasion the lowering of the recording stylus onto the record without stopping of the phonograph operation—undesirable both from the point of view of a likely initial tendency of the stylus to "bounce" on the moving record, and also from the point of view of probable wasting of record space by the operator before he reacted to the changed conditions and himself stopped the machine or modified his use thereof. I prefer, therefore, to further elaborate the circuit so that an automatic stopping of the phonograph operation will be first effected before the automatic shifting of the translating device; and in so doing I may simply incorporate means which positively prevent the operation of the phonograph with translating device conditions inappropriate to the position occupied by the carriage relative to its position of farthest advance.

The further elaborations include the provision, in the switch assembly 165', of an extra pole 226 mechanically connected with the plunger 164 but insulated from the pole 166; of an elongated contact 225 connecting the conductor 122 with the pole 226 independently of the condition of the translating device; and of contacts 227, 228 and 229, to which the pole 226 connects the conductor 122 under recordation, neutral and reproduction conditions, respectively, of the translating device. The contacts 227 and 229 are connected to the pole 124 and the stop contact 126 of the operation-control switch 123 through a double-pole double-throw reversing switch 230; and this reversing switch is operated as part of a relay 231, whose coil 232 is connected to conductor 122 from switch 190, to be energized when and only when that switch is closed (and a slip is in the holder 80). Then the reversing switch 230 connects the contact 227 to a conductor 222 leading to pole 124, and contact 229 to a conductor 221 leading to the stop coil 132 and stop contact 126; while when switch 190 is open the reversing switch 230 connects contact 227 to the conductor 221, and contact 229 to the conductor 222. The contact 228 is permanently connected to the conductor 221; and the connection of the lower contact 167' (analogous to the connection of the lower contact 167 to conductor 122 in Figure 16) is permanently made to the conductor 222.

When the carriage is in a position of farthest advance and the phonograph is being operated for recordation, the connections illustrated in Figure 17 are established; these will be seen to be similar in general to those illustrated in Figure 16, and the switch 123 will of course be effective to control the phonograph operation, e. g., the mandrel rotation and carriage advance. If the translating device were now manually placed in neutral or reproduction condition, the power-supplying conductor 122 would be disconnected from conductor 222 and connected through conductor 221 to the stop electromagnets 132, energizing the latter and stopping the phonograph operation despite the operation-control switch 123 being in run position; this effectively prevents operation of the phonograph in a reproduction, or other than a recordation, condition so long as the carriage is in a position of farthest advance. The solenoid system 160' would be ineffective to restore the translating device to recordation condition so long as the operation-control switch 123 was kept in the illustrated run position, because of the removal of power from conductor 222; but upon the ensuing manipulation of that switch into its stop position, conductor 222 would be supplied with power from conductor 221 through pole 124 and contact 126, and solenoid system 160' would operate to restore the recordation condition proper in view of the carriage being in a position of farthest advance. This automatic restoration would of course occur with the record in a stopped condition. If the central contact 228 be an elongated one and the contact 227 relatively short, then even a manual manipulation of the translating device into recordation condition with the operation-control switch 123 in a run position will still be certain to effect contact of the recording stylus with the record before the latter starts to rotate, and any lowering whatsoever of the recording stylus onto a moving record may be obviated.

When the carriage is not in a position of farthest advance and the phonograph is being operated for reproduction, the switch 190 will be open; the switch 230 will be thrown to the left to connect contact 227 with conductor 221, and contact 229 with conductor 222; the pole 226 will connect the power-supplying conductor 122 with conductor 222 through contact 229 and switch 230; and the switch 123 will be effective to control the phonograph operation in the usual manner. If the translating device were now manually placed in neutral or recordation condition, the power-supplying conductor 122 would be disconnected from the conductor 222 and would be connected through conductor 221 to the stop electromagnets 132, energizing the latter and stopping the phonograph operation despite the operation-control switch 123 being in its run position; this effectively prevents the operation of the phonograph in a recordation, or other than a reproduction, condition while the carriage is not in a position of farthest advance. In this instance there would be no operative change produced by the ensuing manipulation of switch 123 into its stop position, and the operator would be apprized that he must either restore the translating device to reproduction condition or manually bring the carriage up into a position of farthest advance. If the contact 229 be made relatively short, then even a manipulation of the translating device into reproduction condition with the operation-control switch 123 in its run position will be certain to effect contact of the reproducing stylus with the record before the latter starts to rotate, and any lowering of that stylus onto a moving record may be obviated.

If instead of restoring the translating device to reproduction condition the operator, with the translating device in neutral condition, brings the carriage up to a position of farthest advance, the closing of switch 190 upon arrival at that position will connect the solenoid system with the power-supplying conductor 121; then, if the operation-control switch 123 be in stop position, and otherwise as soon as it is brought into stop position, the solenoid system 160' will receive power from conductor 122 through contact 228 and conductors 221 and 222, and the translating device will be biased by the solenoid system into, and in the absence of undue manual restraint will assume, the recordation condition now proper in view of the carriage being in a position of farthest advance.

If the phonograph, conditioned for reproduction, is operated right up to the position of prior farthest advance, it is automatically conditioned for recordation in the following manner: The automatic closing of switch 190 will cause the throwing of the reversing switch 230 from its prior leftward to its illustrated rightward position; and, pole 226 being in contact with 229, conductor 221 and the stop electromagnets 132 will be energized, to stop the phonograph operation despite the switch 123 being in run position. Upon the ensuing manipulation of the operation-control switch 123 to its stop position, the solenoid system 160' will place the translating device in recordation condition with respect to the already-stopped record (as described, in the third paragraph prior hereto, as following an automatic stopping occasioned by manual placement of the translating device in reproduction position during operation of the phonograph for recordation). The phonograph is of course thus automatically placed in readiness for a recording operation, to be begun merely with the usual manipulation of the switch 123 to its run position.

For indicating to the operator that the phonograph is in operation in a condition appropriate to receive dictation or other matter to be recorded, I may connect an indicating device between the run contact 125 of the switch 123 and the side of the advance device switch 190 away from the conductor 121. This I have shown by that connection of a small lamp 240, which mechanically may be mounted on the mouthpiece 128 just forward of the switch 123 to be readily visible by the operator. That connection causes the power supply to the lamp to pass serially through the combination of pole 226 and reversing switch 230; through the switch 190; through the "run" portion of switch 123; and through the switch 87. The first of these is closed (from conductor 122 to conductor 222), during closure of the second, only when the translating device is in recordation condition; the second is closed only when the carriage is in a condition of farthest advance; the third is closed, during closure of the first two, only during mandrel rotation; and the fourth is closed only while a slip is in the holder (and therefore while a record is on the mandrel). Illumination of the lamp accordingly indicates jointly that the carriage is in a position of farthest advance, that the translating device is adjusted for recordation, that a record is mounted on the mandrel, and that the mandrel is turning. Thus by a connection of the utmost simplicity I cause the signal or indicating device 240 to act only when there jointly exist the many conditions simultaneously required to exist for availability of the phonograph to receive matter to be recorded; insofar as I am aware, an influence on the indicating device by some of these conditions has been heretofore obtained, if at all, only by resort to complicated additional switching devices serving no other useful function.

It will be understood that while I have illustrated and described my invention in terms of particular embodiments thereof, as to its broader aspects I intend no unnecessary limitations by virtue of the details of those embodiments, for those details may obviously be varied within wide limits without departure from the true spirit and scope of the invention. In many of the claims hereto appended I undertake to express that scope broadly, subject however to such proper limitations as the state of the art may impose.

I claim:

1. In a phonograph including means for supporting a record: the combination of a translating device arranged for translation-effecting movement relative to the record, and selectively conditionable at least in one translational condition and in a neutral condition with respect to the record; means responsive to the condition of said device; driving means operable to effect said movement; means for controlling the operation of said driving means; means actuable to stop the operation of said driving means; two conductors selectively energizable to render effective said controlling means and said stopping means; and switch means, controlled by said responsive means, for selectively energizing said conductors.

2. In a phonograph including means for supporting a record: the combination of a translating device arranged for translation-effecting advancing movement and for backspacing relative to the record; driving means operable to effect said advancing movement; means differentially responsive to a position of farthest advance of said translating device and to a position backspaced therefrom; means for controlling the operation of said driving means; means actuable to stop the operation of said driving means; two conductors selectively energizable to render effective said controlling means and said stopping means; and switch means, controlled by said responsive means, for selectively energizing said conductors.

3. In a phonograph including means for supporting a record: the combination of a translating device arranged for translation-effecting advancing movement and for backspacing relative to the record, and selectively conditionable at least in one translational condition and in another condition with respect to the record; means differentially responsive to a position of farthest advance of said translating device and to a position backspaced therefrom; means responsive to the condition of said device; driving means operable to effect said advancing movement; means for controlling the operation of said driving means; means actuable to stop the operation of said driving means; two conductors selectively energizable to render effective said controlling means and said stopping means; and switch means, controlled by both said responsive means, for selectively energizing said conductors.

4. In a phonograph including means for supporting a record, a translating device arranged for translation-effecting advancing movement and for backspacing relative to the record, and means for indicating the position of said device relative to the record; advance means biased in one direction but movable in the opposite direction in accordance with advancing movement of said device; means normally effective to restrain said advance device from movement in said one direction; holding means into and from which an index blank may be inserted and removed, and with which said indicating means is associated for cooperation with a blank held therein; and means, responsive to change of index blanks in said holder, for effecting the release of said advance means from said restraining means.

5. In a phonograph including means for supporting a record: the combination of a translating device arranged for translation-effecting advancing movement and for backspacing relative to the record, and selectively conditionable for recordation upon and reproduction from the record; driving means operable to effect said advancing movement; control means, having run and stop positions, normally effective to control said driving means; means, automatically operated when the translating device is advanced in reproduction condition from out of into a position of prior farthest advance, for stopping said driving means; and means, operated by said control means upon its ensuing manipulation to stop position, for shifting said translating device into recordation condition.

6. In a phonograph including means for supporting a record, a translating device arranged for translation-effecting movement relative to the record, and means for indicating the position of said device relative to the record: the combination of holding means into and from which an index blank may be inserted and removed, and with which said indicating means is associated for cooperation with a blank held therein; electrically actuable means for selectively conditioning said device at least in one translational condition and in another condition; and switch means, associated with said holding means and controlled by the index blank, connected with said electrically actuable means to control the same.

7. In a phonograph including means for supporting a record, a translating device arranged for translation-effecting movement relative to the record, and means for indicating the position of said device relative to the record: the combination of holding means into and from which an index blank may be inserted and removed, and with which said indicating means is associated for cooperation with a blank held therein; means for selectively conditioning said device at least in one translational condition and in a neutral condition; and means, operated by the index blank in its removal from said holding means, for operating said conditioning means to place said device in neutral condition.

8. In a phonograph including means for supporting a record, a translating device arranged for translation-effecting movement relative to the record, and means for indicating the position of said device relative to the record: the combination of holding means into and from which an index blank may be inserted and removed, and with which said indicating means is associated for cooperation with a blank held therein; means for selectively conditioning said device at least in one translational condition and in another condition; and means, operated by the index blank in its insertion into said holding means, for operating said conditioning means to place said device in said one translational condition.

9. In a phonograph including a record support onto and from which a record may be mounted and removed, and a translating device arranged for translation-effecting advancing movement and for backspacing relative to the record and selectively conditionable for recordation upon and reproduction from the record: the combination of switch means controlled by said translating device and closed only when said device is in recordation condition and in a position of farthest advance; switch means closed by the record upon the mounting thereof on said support; an indicating device; and a circuit serially including said indicating device and both said switch means.

10. In a phonograph including means for supporting a record, a translating device arranged for translation-effecting movement relative to the record, and means for indicating the position of said device relative to the record: the combination of holding means into and from which an index blank may be inserted and removed, and with which said indicating means is associated for cooperation with a blank held therein; means for selectively conditioning said device at least in one translational condition and in another condition; and means, operated by the index blank, for controlling said conditioning means.

11. In a phonograph including means for supporting a record, a translating device arranged for translation-effecting movement relative to the record, and means for indicating the position of said device relative to the record: the combination of holding means into and from which an index blank may be inserted and removed, and with which said indicating means is associated for cooperation with a blank held therein; means for selectively conditioning said device at least in one translational condition and in another condition; control means having a portion extending into cooperative relationship with the index blank for operation of the control means concomitant with removal of the blank from the holding means; and means, rendered effective by said control means, for operating said conditioning means.

12. In a phonograph including means for supporting a record, a translating device arranged for translation-effecting movement relative to the record, and means for indicating the position of said device relative to the record: the combination of holding means into and from which an index blank may be inserted and removed, and with which said indicating means is associated for cooperation with a blank held therein; means for selectively conditioning said device at least in one translational condition and in another condition; control means having a portion extending into cooperative relationship with the index blank for operation of the control means concomitant with insertion of the blank into the holding means; and means, rendered effective by said control means, for operating said conditioning means.

13. In a phonograph including means for supporting a record, a translating device arranged for translation-effecting movement relative to the record, and means for indicating the position of said device relative to the record: the combination of holding means into and from which an index blank may be inserted and removed, and with which said indicating means is associated for cooperation with a blank held therein; stylus means in said device; means for selectively placing said stylus means in and out of record-engaging position; and means, having a portion extending into cooperative relationship with the index blank for operation concomitant with removal of the blank from the holding means, for operating said stylus-placing means to place said stylus means out of record-engaging position.

14. In a phonograph including means for supporting a record, a translating device arranged for translation-effecting movement relative to the record, and means for indicating the position of said device relative to the record, said device being selectively conditionable in three conditions with respect to the record: the combination of holding means into and from which an index blank may be inserted and removed, and with which said indicating means is associated for cooperation with a blank held therein; control means having a portion extending into cooperative relationship with the index blank for operation of the control means concomitant with insertion of the blank into the holding means; and means connected with said control means and rendered effective thereby upon operation thereof only when said translating device is in a first of said conditions, for placing said device in a second of said conditions.

15. In a phonograph including means for supporting a record, a translating device arranged for translation-effecting movement relative to the record, and means for indicating the position of said device relative to the record, said device being selectively conditionable at least in one translational condition and in a neutral condition with respect to the record: the combination of holding means into and from which an index blank may be inserted and removed, and with which said indicating means is associated for cooperation with a blank held therein; means, connected with said translating device and adapted to bias the same into neutral condition; and control means, having a portion extending into cooperative relationship with the index blank for operation of the control means concomitant with removal of the blank from the holding means, for rendering said biasing means effective.

16. In a phonograph including means for supporting a record, a translating device arranged for translation-effecting movement relative to the record, and means for indicating the position of said device relative to the record, said device being selectively conditionable at least in one translational condition and in another condition with respect to the record: the combination of holding means into and from which an index blank may be inserted and removed, and with which said indicating means is associated for cooperation with a blank held therein; means, connected with said translating device and adapted to bias the same into said one translational condition; and control means, having a portion extending into cooperative relationship with the index blank for operation of the control means concomitant with insertion of the blank into the holding means, for rendering said biasing means effective.

17. In a phonograph including a support onto and from which a record may be mounted and removed, a translating device arranged for translation-effecting movement relative to the record, and means for indicating the position of said device relative to the record: the combination of holding means into and from which an index blank may be inserted and removed, and with which said indicating means is associated for cooperation with a blank held therein; a member associated with said holding means and movable into and out of a position obstructing the insertion of an index blank therein; and movable means, having a portion extending into cooperative relationship with the record for movement concomitant with record mounting on the support, connected with said member to control the position thereof.

18. In a phonograph including a support onto and from which a record may be mounted and removed, a translating device arranged for translation-effecting movement relative to the record, and means for indicating the position of said device relative to the record: the combination of holding means into and from which an index blank may be inserted and removed, and with which said indicating means is associated for cooperation with a blank held therein; a member associated with said holding means and movable into and out of a position obstructing the insertion of an index blank therein; movable means having a portion extending into cooperative relationship with the record for movement concomitant with record mounting and removal on and from the support; and means operatively connecting said member with said movable means for movement thereby.

19. In a phonograph including a support onto and from which a record may be mounted and removed, a translating device arranged for translation-effecting movement relative to the record, and means for indicating the position of said device relative to the record, said device being selectively conditionable at least in one translational condition and in a neutral condition with respect to the record: the combination of holding means into and from which an index blank may be inserted and removed, and with which said indicating means is associated for cooperation with a blank held therein; means for placing said translating device in said translational condition as an incident of insertion of an index blank in said holding means; movable means having a portion extending into cooperative relationship with the record for movement concomitant with record mounting and removal on and from the support; and means, associated with said holding means and rendered effective by said movable means while no record is on the support, for obstructing the insertion of an index blank in the holding means.

20. In a phonograph including a support onto and from which a record may be mounted and removed, a translating device arranged for translation-effecting movement relative to the record, and means for indicating the position of said device relative to the record: the combination of holding means into and from which an index blank may be inserted and removed, and with which said indicating means is associated for cooperation with a blank held therein; a member associated with said support and movable into and out of a position obstructing the removal of a record therefrom; and means, having a portion extending into cooperative relationship with the index blank for operation concomitant with removal of the blank from the holding means, connected with said member to move the same out of said position.

21. In a phonograph including a support onto and from which a record may be mounted and removed, a translating device arranged for translation-effecting movement relative to the record, and means for indicating the position of said device relative to the record, said device being selectively conditionable at least in one translational condition and in a neutral condition with respect to the record: the combination of holding means into and from which an index blank may be inserted and removed, and with which said indicating means is associated for cooperation with a blank held therein; means for placing said translating device in a neutral condition as an incident of removal of an index blank from said holding means; movable means having a portion extending into cooperative relationship with the index blank for movement concomitant with insertion and removal of the blank into and from the holding means; and means, associated with said support and rendered effective by said movable means when an index blank is in said holding means, for obstructing the removal of a record from said support.

22. In a phonograph including means for supporting a record, a translating device arranged for translation-effecting movement relative to the record away from an initial relationship thereto, and means for indicating the position of said device relative to the record; the combination of holding means into and from which an index blank may be inserted and removed, and with which said indicating means is associated for cooperation with a blank held therein; means for returning said translating device to its initial relationship to the record; and control means, operated by the index blank, for rendering said returning means effective.

23. In a phonograph including means for supporting a record, a translating device arranged for translation-effecting movement relative to the record away from an initial relationship thereto, and means for indicating the position of said device relative to the record: the combination of holding means into and from which an index blank may be inserted and removed, and with which said indicating means is associated for cooperation with a blank held therein; means for returning said translating device to its initial relationship to the record; and control means, having a portion extending into cooperative relationship with the index blank for operation of the control means concomitant with removal of the blank from the holding means, for rendering said returning means effective.

24. In a phonograph including means for supporting a record and a translating device arranged for translation-effecting advancing movement and for backspacing relative to the record and selectively conditionable for recordation upon and reproduction from the record: the combination of driving means operable to effect said advancing movement; movable means cooperating with the translating device to define the position of the translating device relative to a position of farthest advance thereof; movable means operatively connected with the translating device to define the condition of said device; and means, operatively connected with both said movable means and rendered effective thereby when said translating device is in recordation condition and backspaced from its position of farthest advance, for positively maintaining said driving means out of operation.

25. In a phonograph including means for supporting a record, and a translating device arranged for translation-effecting advancing movement and for backspacing relative to the record and selectively conditionable in recordation, reproduction and neutral conditions relative to the record: the combination of driving means operable to effect said advancing movement; movable means cooperating with the translating device to define the position of the translating device relative to a position of farthest advance thereof; movable means operatively connected with the translating device to define the condition of said device; and means, operatively connected with both said movable means and rendered effective thereby when said translating device is in other than reproduction condition and is backspaced from its position of farthest advance, for positively maintaining said driving means out of operation.

26. In a phonograph including means for supporting a record, a translating device arranged for translation-effecting advancing movement and for backspacing relative to the record and selectively conditionable for recordation upon and for reproduction from the record, and driving means operable to effect said advancing movement: the combination of movable means cooperating with the translating device to define the position of the translating device relative to a position of farthest advance thereof; movable means operatively connected with the translating device to define the condition of said device; means actuable to stop the operation of said driving means; and means, operatively connected with both said movable means and rendered effective thereby when said translating device is in recordation condition and backspaced from its position of farthest advance, for actuating said stopping means.

27. In a phonograph including means for supporting a record, a translating device arranged for translation-effecting advancing movement and for backspacing relative to the record and selectively conditionable in recordation, reproduction and neutral conditions relative to the record, and driving means operable to effect said advancing movement; the combination of movable means cooperating with the translating device to define the position of the translating device relative to a position of farthest advance thereof; movable means operatively connected with the translating device to define the condition of said device; means actuable to stop the operation of said driving means; and means, operatively connected with both said movable means and rendered effective thereby when said translating device is in other than reproduction condition and is backspaced from its position of farthest advance, for actuating said stopping means.

28. In a phonograph including means for supporting a record, and a translating device arranged for translation-effecting advancing movement and for backspacing relative to the record and selectively conditionable at least in one translational condition and in another condition: the combination of power-operated means for conditioning said device in said translational condition; movable means cooperating with the translating device to define the position of the translating device relative to a position of farthest advance thereof; and an electric circuit closable to supply power to said conditioning means, said circuit being controlled by said movable means and opened thereby when said translating means is not in a position of farthest advance.

29. In a phonograph including means for supporting a record, a translating device arranged for translation-effecting movement relative to the record and selectively conditionable at least in one translational condition and in a neutral condition with respect to the record, and driving means operable to effect said movement: the combination of power-operated means for stopping the operation of said driving means; movable means operatively connected with the translating device to define the condition of said device; and an electric circuit, controlled by said movable means and closed thereby when said translating device is in neutral condition, for supplying power to said stopping means.

30. In a phonograph including means for supporting a record, a translating device arranged for translation-effecting advancing movement away from an initial position and for backspacing relative to the record, and means for indicating the position of said device relative to the record, the combination of advance means movable away from an initial position in a manner to define the position of farthest advance of said translating device; holding means into and from which an index blank may be inserted and removed, and with which said indicating means is associated for cooperation with a blank held therein; means operable to effect a return movement of said translating device and a restoring movement of said advance means; and means having a portion extending into cooperative relationship with the index blank for operation concomitant with removal of the blank from the holding means, for rendering said last-recited means effective.

RICHARD M. SOMERS.

CERTIFICATE OF CORRECTION.

Patent No. 2,212,672. August 27, 1940.

RICHARD M. SOMERS.

It is hereby certified that error appears in the printed specification of the above numbered patent requiring correction as follows: Page 2, first column, line 42, for "ts" read --its--; page 3, first column, line 9, for "rod 4" read --rod 44--; line 42, strike out the word "to"; page 5, first column, line 15, strike out "the" second occurrence; page 6, first column, line 66, for "closely" read --closedly--; page 7, first column, line 50, before "when" strike out the parenthesis mark; page 12, first column, line 4, claim 4, strike out the semicolon and insert instead the colon and words --: the combination of--; same page, second column, line 4, beginning with "In a phonograph" strike out all to and including "switch means." in line 18, and insert instead the following as claim 9 -

> In a phonograph including means for supporting a record, a translating device arranged for translation-effecting movement relative to the record, driving means operable to effect said movement, and primary control means for said driving means; the combination of a stylus in said device engageable with the record; movable means with which said stylus is operatively connected to be brought thereby into record engagement in an initial portion of a movement thereof; and supplemental control means for said driving means electrically connected therewith, said supplemental control means being also connected with said movable means and rendered effective thereby, wholly prior to the conclusion of said movement thereof, to positively maintain said driving means out of operation independent of the condition of said primary control means.

page 15, second column, line 2, claim 30, after "record" strike out the comma and insert instead a semicolon; line 11, same claim, after the word "means" second occurrence, insert a comma; and that the said Letters Patent should be read with this correction therein that the same may conform to the record of the case in the Patent Office.

Signed and sealed this 4th day of February, A. D. 1941.

(Seal)

Henry Van Arsdale,
Acting Commissioner of Patents.